April 9, 1968

L. E. McNULTY 3,377,487

UNDERGROUND RESIDENTIAL POWER DISTRIBUTION CONSTRUCTION

Filed April 19, 1965

INVENTOR

Lyle E. McNulty

BY

Lee H Kaiser

ATTORNEY

April 9, 1968   L. E. McNULTY   3,377,487
UNDERGROUND RESIDENTIAL POWER DISTRIBUTION CONSTRUCTION
Filed April 19, 1965   5 Sheets-Sheet 2

INVENTOR
Lyle E. McNulty
BY
Lee H. Kaiser
ATTORNEY

April 9, 1968     L. E. McNULTY     3,377,487
UNDERGROUND RESIDENTIAL POWER DISTRIBUTION CONSTRUCTION
Filed April 19, 1965     5 Sheets-Sheet 3

INVENTOR
Lyle E. McNulty
BY
Lee N. Kaiser
ATTORNEY

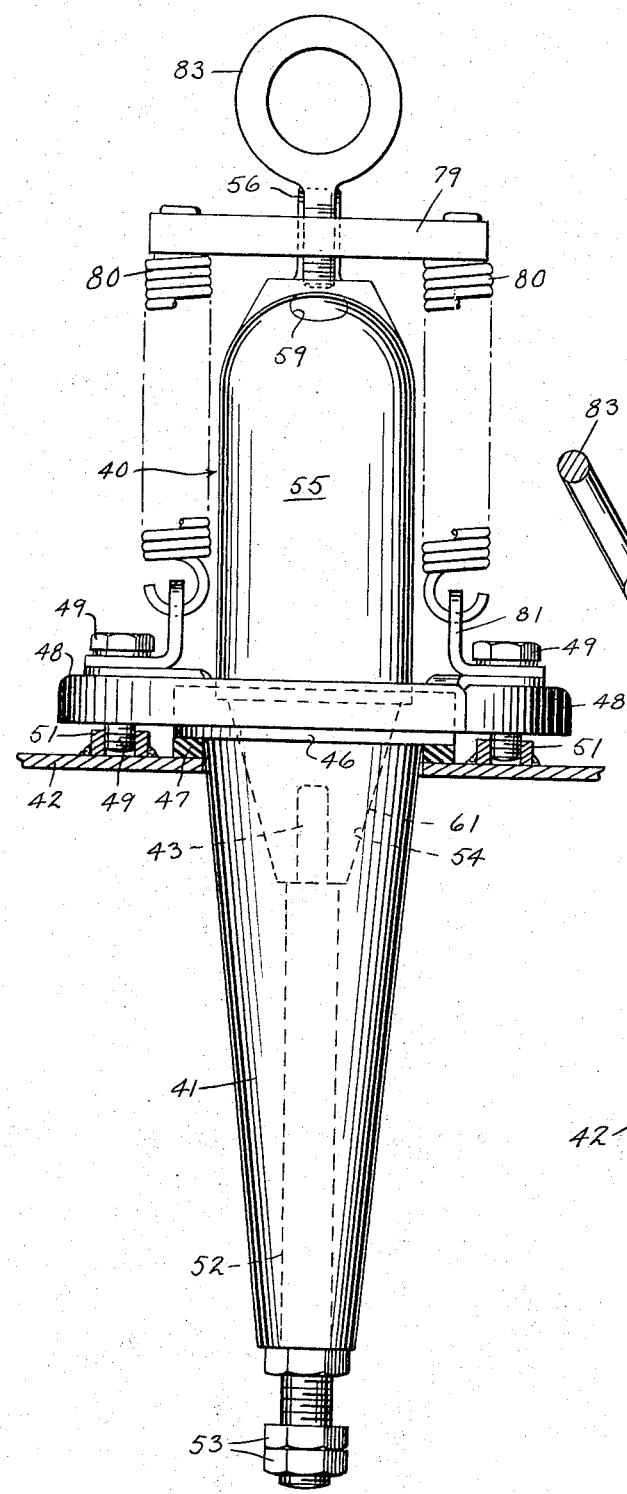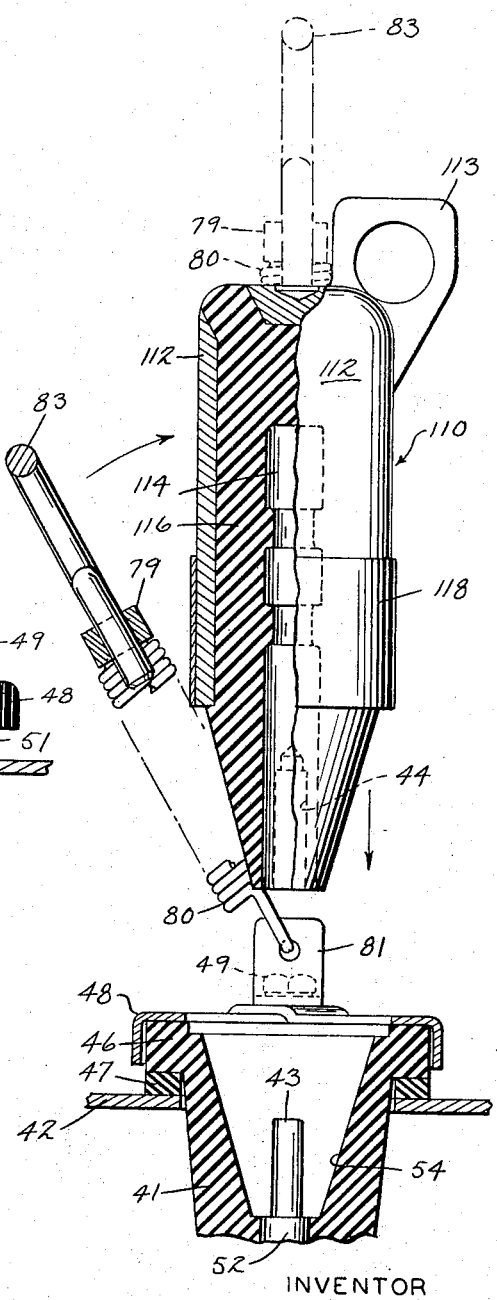

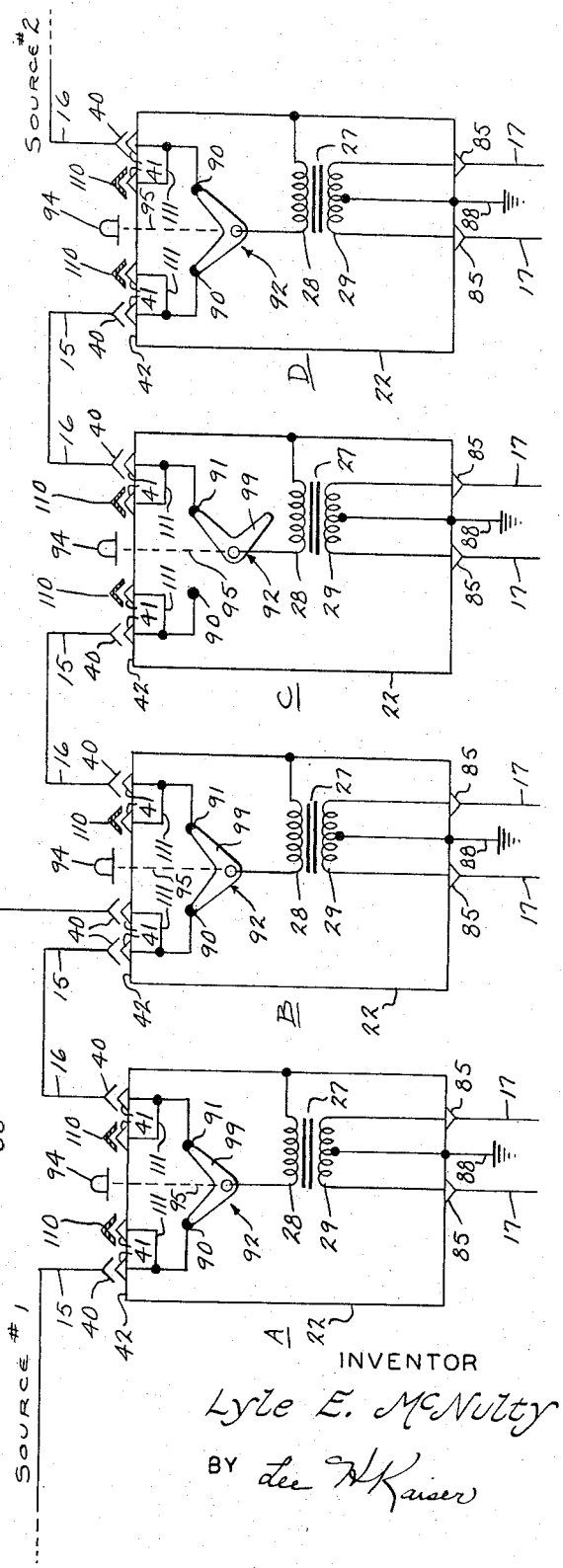
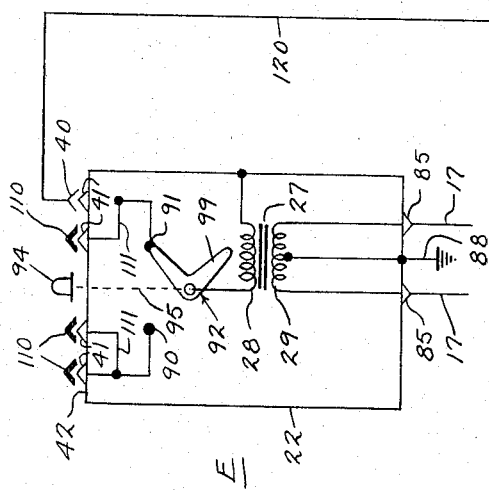
Fig. 6

United States Patent Office 3,377,487
Patented Apr. 9, 1968

3,377,487
UNDERGROUND RESIDENTIAL POWER
DISTRIBUTION CONSTRUCTION
Lyle E. McNulty, South Milwaukee, Wis., assignor to
McGraw-Edison Company, Milwaukee, Wis., a corporation of Delaware
Filed Apr. 19, 1965, Ser. No. 448,934
13 Claims. (Cl. 307—17)

ABSTRACT OF THE DISCLOSURE

An underground residential electrical power distribution construction comprising a tubular open-ended vault disposed vertically below grade and having conductor passage means extending therethrough and a removable cover closing its upper end. A distribution transformer is disposed within the vault and has a sealed metallic casing for enclosing primary and secondary windings. First, second and third primary insulating bushings are disposed on the casing and each has similar first connector and second mating members exterior of the casing. A test cap comprising an insulating member covers one of the second connector members and is surrounded by an outer conductive element which is releasably secured to the casing by conductive means. Each of the other second conductor members is surrounded by a cable termination which includes an inner insulating portion and an outer conductive member which is releasably secured to the casing. The first and second primary bushings are connected within the casing and a sectionalizing switch is disposed within the casing and has contact means for selectively connecting and disconnecting the second and third bushings to each other and individually to the primary winding, and means extending through the casing for operating the sectionalizing switch.

Background of the invention

This invention relates to underground residential electrical power distribution systems.

Overhead electrical power distribution systems are aesthetically displeasing and detract from the beauty of residential areas. In an attempt to improve the aesthetic appearance of distribution systems, electrical utilities have installed buried cable with distribution transformers enclosed within metallic housings supported on concrete pads at ground level. Completely underground power distribution systems with concrete vaults are also used in the commercial and more built-up portions of cities having heavy transformers and a multiplicity of service connections to buildings. Although an underground system improves the appearance of a residential neighborhood and minimizes the problem of wind, ice, and tree limb damage and also reduces the likelihood of lighting damage, the high cost of an underground system in comparison to overhead has discouraged more widespread adoption of underground distribution systems for residential services. Ground level distribution transformers having metallic housings supported on concrete pads at ground level are relatively expensive and time consuming to construct, particularly in that they require forms for the concrete pad and inherently involve delay while the poured concrete sets, and are also difficult to camouflage so that they do not detract from the appearance of the residential area. Known completely buried and semi-buried power distribution constructions are inflexible in that they do not have sectionalizing means and do not permit changeover to an alternate power source in the event of a fault at one location on a loop system. Known buried and semi-buried power distribution systems are difficult and costly to install in that the primary cable terminations require either pouring of potting compound in the field or manual taping to construct stress cones, and both operations involve the danger of deterioration of the insulation due to generation of corona resulting from air voids. Further, known completely buried and semi-buried power distribution constructions are difficult and dangerous to repair, service, and maintain and do not permit crews to follow the standard operating and safety practices applicable to overhead construction. In known underground distribution systems, no means are provided at the underground transformer to disconnect the primary while repairing the transformer, the lineman cannot establish a visible open in the primary underground cables so that safety of the lineman is absolutely assured during services and repair of the transformer, and no means are provided to permit the lineman to test whether the transformer is energized before repairing, or servicing the transformer. Further, it is difficult to tap a radial feeder on an existing completely buried or semi-buried distribution system.

It is an object of the invention to provide a buried residential distribution construction which provides easier installation, greater safety, greater flexibility in operation, and greater economy than is possible with known underground distribution systems. Another object is to provide a residential underground power distribution construction which is concealed from view, is competitive in cist with systems having surface-mounted transformers, has load-break foolproof switching, is completely operable with conventional hot sticks, and has submersible, leakproof transformers and separable, submersible high voltage connectors.

A further object of the invention is to provide an underground residential distribution construction which permits line crews to utilize the same operating and safety practices as with overhead construction such as the ability: (1) to test whether a circuit is energized, (2) to establish a ground on the circuit, and (3) to provide a visible open after sectionalizing the power line.

Another object of the invention is to provide an underground residential distribution construction which, in the event of a fault on an underground primary cable, permits the lineman to locate the faultered cable, isolate that section of the cable, and provide a visible open in the circuit by disconnecting the cable and grounding that circuit.

A still further object of the invention is to provide an underground residential distribution construction which is applicable to radial or modified loop systems and which has load-break ability and permits fast changeover to an alternate source of power in the case of fault on the system, thereby assuring good service continuity.

A further object of the invention is to provide an underground residential distribution construction which permits easy tapping of a feeder on an existing system.

Another object is to provide an underground residential distribution construction which is lower in initial cost and lower in installation cost then known underground distribution systems and provides adequate security to deter unauthorized personnel from tampering with the system.

Still another object is to provide an underground residential distribution construction having sectionalizing means which alternatively permits both sources to be open and the transformer de-energized to allow service and repair; either source to be open and the transformer energized from the other source; or the two sources interconnected and the transformer energized.

A still further object of the invention is to provide an underground residential distribution construction which has a "dead front" and is always maintained at ground potential and guarantees complete safety to operating personnel. Another object is to provide such a construction which is submersible and has separable connectors for the primary cables which are easily opened by Hotstick, which can withstand a relatively high head of water indefinitely without deterioration, and which have high continuous current rating, high basic impulse voltage level, and a corona extinction voltage considerably above the power system voltage. Still another object is to provide such a construction wherein the separable connectors for the high voltage cables occupy minimum space and are easily assembled in the field without requiring taping or potting compounds.

*Brief description of the drawings*

FIG. 4 is an elevation view, partly in section, of the connector of FIG. 3 and taken at right angles to the view of FIG. 3;

FIG. 5 is a vertical sectional view through one of the test caps of the embodiment of FIG. 1 which permit a lineman to test whether the circuit is energized; and FIG. 6 is a schematic circuit diagram of a modified loop underground power distribution system embodying the construction of FIG. 1.

*Description of the preferred embodiment*

Figure 1:
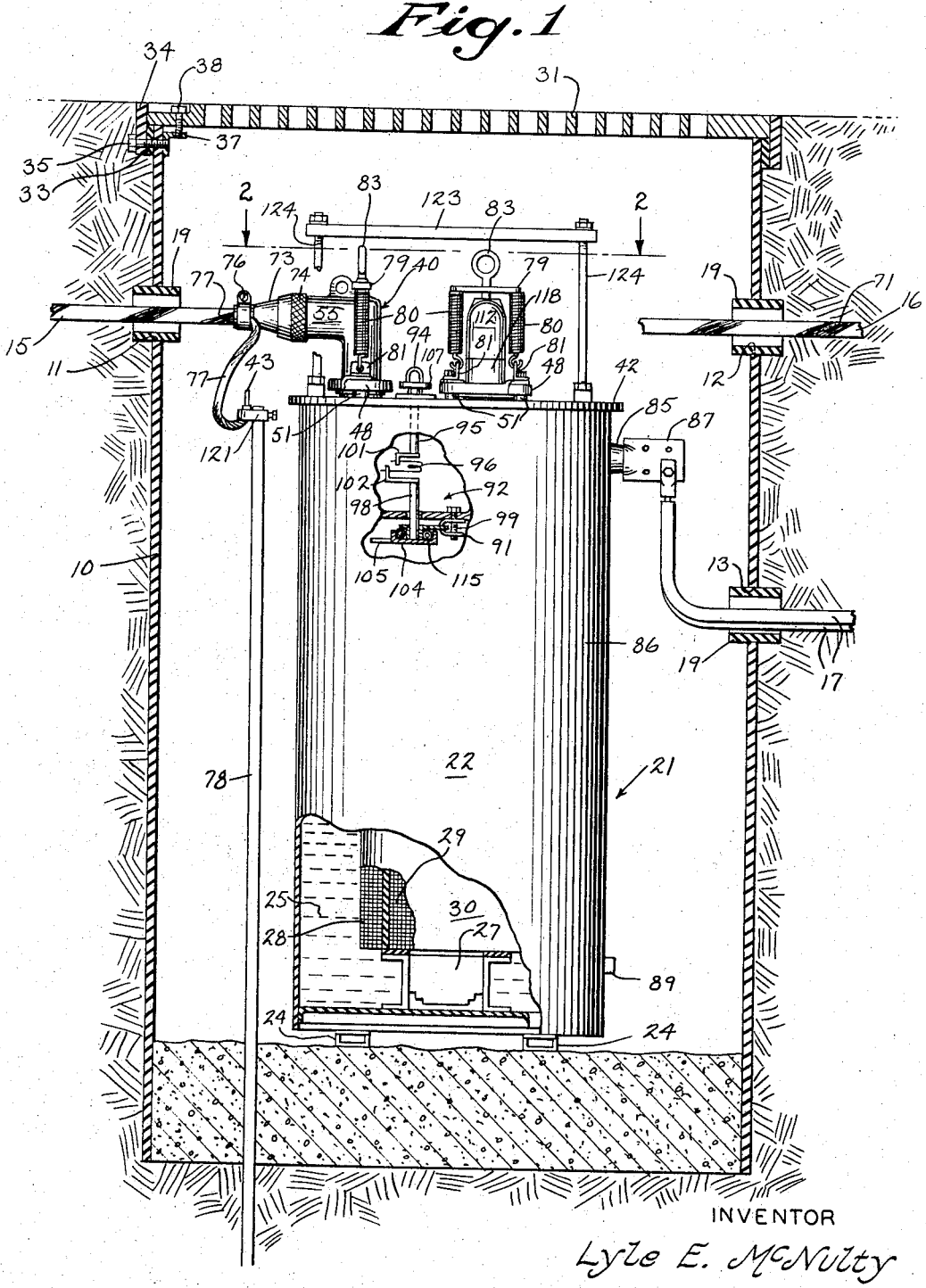
FIG. 1 is a vertical section view through a residential underground power distribution construction embodying the invention.

Referring to FIG. 1 of the drawing, the residential underground electrical power distribution construction includes a tubular vault 10 preferably a bituminized fiber, for example, fiber impregnated with coal tar pitch, buried in the earth with its open upper end at ground level. Vault 10 may be approximately three feet in diameter and approximately five feet in length and is relatively light in weight. Installation of vault 10 is greatly simplified in comparison to distribution systems utilizing concrete pads or kiosks since no concrete pouring forms are required, no time delay is involved while the poured concrete sets, and the vault can be inserted by hand without need for special hoisting and lowering equipment in a cylindrical hole bored in the soil by an earth auger which is standard equipment for electrical utilities. The bituminized fiber vault 10 is low in cost, mechanically strong in comparison to the brittleness of concrete, relatively light in weight and easy to ship, inert to all types of soil, provides maximum resistance to compressive forces and has exceptionally long life. The bituminized fiber is nonconductive; immune to electrolysis, corrosion or erosion; is not affected by alkali, acid or other deteriorating ground conditions, and is not attacked by vegetable growth or tree roots. The tubular vault 10 has high compressive strength resisting crushing forces transverse to the axis thereof tending to crush it.

The coal tar pitch impregnated vault 10 is readily adapted in the field to any array of underground cable and residence loads since cable openings 11, 12, and 13 can easily be cut in the field with a wing cutter, rather then using precast or power-drilled holes such as required with a concrete kiosk, at the most advantageous position in circumferential and axial directions for an incoming underground primary cable 15 and an outgoing primary cable 16 of a loop feed and for underground secondary cable 17 to a residential load respectively. This construction eliminates cable entrance opening costs, and conduits 19 of bituminized fiber pipe for the primary and secondary cables 11, 12, and 13 may be driven into the apertures 15, 16, and 17 in vault 10.

Vault 10 encloses a submersible type distribution transformer 21 below ground level which may rest on a backfill of gravel at the bottom of vault 10. The casing 22 of transformer 21 is preferably of 3/16 inch thick steel and is coated with a suitable corrosion resistant bitumastic compound to provide maximum resistance against rust and corrosion. A plurality of spaced apart feet 24 secured to the bottom wall of casing 22 may raise transformer 21 above the gravel backfill and permit accumulation of water and debris within vault 10 before the thermal characteristics of the transformer are affected. Casing 22 preferably contains an insulating and cooling liquid dielectric 25 such as transformer oil. A transformer core and coil assembly immersed in the liquid dielectric 25 within casing 22 includes a magnetic core 27 linked by a high voltage primary winding 28 and a low voltage secondary winding 29 forming cylindrical coils 30 which surround winding legs of magnetic core 27.

The open end of vault 10 is preferably closed by a cast iron grate 31 flush with the surface of the ground and resting upon the upper edge of tubular vault 10. Grate 31 may be received within a seat defined by an upstanding circumferential flange formed by a pair of overlapping bituminized fiber rings 33 and 34 telescoped over tubular vault 10 adjacent the upper end thereof and affixed thereto by radially extending pins 35 and by coal tar pitch. L-shaped brackets 37 secured to the inner periphery of vault 10 by the radial pins 35 have threaded openings which receive bolts 38 for securing grate 31 to vault 10, and bolts 38 preferably have pentagonal heads of five-side configuration which cannot be engaged by conventional wrenches, thereby deterring unauthorized personnel from removing grate 31.

Separable elbow connectors 40 are provided on casing cover 22 for the incoming and outgoing primary cables 15 and 16, and separable connectors 40 are preferably of the submersible type which can withstand a considerable head of water without leakage even if water accumulates within vault 10. Each connector 40 mates with an insulating bushing 41 which extends through an aperture in cover 42 of casing 22 and is provided with an upwardly extending metallic male connector member, or bayonet 43 adapted to mate with a metallic female connector member, or receptacle 44 of the elbow connector. Insulating bushing 41 is generally of frustoconical configuration and has an outwardly extending circumferential flange 46 disposed against the exterior of casing cover 42 with a resilient gasket 47 compressed therebetween to provide a hermetic seal for casing 22. A split type clamp 48 disposed against bushing flange 46 has clearance apertures therein which receive clamping bolts 49 engaged within internally threaded bosses 51 welded to cover 42 to rigidly affix insulating bushing 41 to cover 42 and compress gasket 47. Bayonet 43 is provided at one end of a conductor stud 52 molded axially within insulating bushing 41, and the end of conductor stud 52 within the interior of casing 22 is threaded to receive nuts 53 for connecting a conductor thereto. Insulating bushing 41 has a conical compartment 54 at its upper end.

Elbow connector 40 permits making a right angle connection from a shielded high voltage cable 15 or 16 to the insulating bushing in considerable less space within the vault than would be required for a pothead type cable termination which necessitates excessive vertical height because of the restricted bending radius of the high voltage underground cable. Connector 40 includes an outer tubular body member 55 of suitable metal such as aluminum having a right angle bend therein. Elbow body member 55 has an eye 56 to permit installation and removal by a hotstick and surrounds an interchange L-shaped member 57 of high conductivity metal such as copper disposed within body member 55 in spaced relation to the inner surface thereof. A suitable compressible insulating material having high dielectric strength and high surface resistivity such as silicone rubber is poured within body member 55 preferably at the factory through an aperture 59 and cured therein to form a tubular insulating member 60 between interchange member 57 and body member 55. Interchange member 57 terminates at one end in the receptacle 44 and at the opposite end in a female connector portion, or receptacle 62 having internal threads adapted to mate with a threaded male connector member, or terminal stud 63 crimped on the conductor 64 of one of the primary cables 15 or 16. At one end tubular insulating body 60 terminates in a frustoconical portion 66 surrounding connector receptacle 44 and adapted to fit within complementary compartment 54 in insulating bushing 41. Insulating body 60 at its opposite end also terminates in a frustoconical portion 67 surrounding an axial opening 68 for the cable insulation 69.

Elbow connector 40 is easily assembled to a primary cable 15 or 16 in the field without taping and without pouring of potting compound. No special aptitudes, skills, or extended training are necessary to make a completely satisfactory splice; the work may be done in midsummer or in the bitter cold of winter, no compounds need be mixed and no curing time is required; and only simple tools such as a hacksaw, a knife, and a penciling tool are required. Primary cable 15 or 16 may have a central conductor 64 of copper surrounded by successive layers of polyethylene insulation 69, semi-conductive material 70, and exposed neutral conductor strands 71. The neutral strands 71 are first laid back to expose approximately twelve inches of the semi-conductive material 70; approximately six inches of cable is cut off; the semi-conductive layer 70 and insulation 68 are cut back approximately 1½ inches to expose copper conductor 64; approximately three inches of semi-conductive layer 70 is removed; the polyethylene insulation 68 is penciled with a suitable tool; and terminal stud 63 is then crimped on cable conductor 64.

A prefabricated, metallic, electrical stress relief member 73 of frustoconical shape and an internally threaded metallic draw nut 74 are placed over the cable so that the tubular extension on stress relief member 73 is disposed above the semi-conductive material 70 and extends up to the neutral strands 71. The penciled insulation is then inserted into axial opening 68 in insulating body 60, and terminal stud 63 is engaged within the female threads in receptacle 62. Nut 74 is then engaged with external threads on body member 55, and when nut 74 is tightened it urges stress relief member 73 firmly against frustoconical portion 67 of resilient insulating body 60. Neutral strands 71 are then folded over the tubular extension on stress relief member 73 and are secured with a compression type clamp 76 which urges stress relief member 73 against the semi-conductive layer 70. Neutral strands 71 are then twisted into a pigtail 77 which may be secured to a grounding rod 78 driven into the earth.

Elbow connector 40 may then be engaged by a hotstick inserted within eye 56 and assembled into the insulating bushing 41 so that bayonet 43 mates with receptacle 44. Connector 40 is secured to casing cover 42 by a metallic bridging bar 79 affixed at its ends to tension hold-down springs 80 disposed on diametrically opposite sides of insulating bushing 41 and having hook-shaped ends engaged within apertures in L-shaped brackets 81 which are secured to casing cover 42 by the same clamping bolts 49 which affix the split clamp 48 thereto. A threaded aperture at the center of bridging bar 79 receives an eyebolt 83 adapted to accommodate a hotstick, and bridging bar 79 may be lifted over body member 55 and eyebolt 83 turned by means of the hotstick until eyebolt 83 abuts against body member 55 of the elbow connector 40, whereby further rotation of eyebolt 83 will tension hold-down springs 80 and thus urge elbow connector 40 against insulating bushing 41. The silicone rubber of insulating body 60 is resilient, and hold-down springs 80 compress frustoconical portion 66 thereof against the complementary compartment 54 in the insulating bushing 41 and thus provide a compression fit which prevents entrance of moisture into the connector even under a considerable head of water within vault 10.

Stress relief member 73 forms an increased diameter extension on the grounded cable outer wrapping which prevents concentration of lines of electrical force at the end of the semi-conductive layer 70 and substantially reduces voltage gradients in an axial direction, thereby eliminating costly and difficult-to-fabricate manually taped stress cones. The metallic body portion 55 of the connector forms a continuation of the cable ground shield and is electrically connected to the grounded metallic casing 22 through bridging bar 79 and hold-down springs 80, thereby providing a safe "dead front" connection wherein the outside of the connector is maintained at ground potential and complete safety to operating personnel is guaranteed.

Elbow connector 40 has a continuous current rating of 200 amperes, a basic impulse level of 95 kilovolts, and 15 kilovolt class insulation. The electrical stress between "hot" interchange member 57 and grounded outer body 55 is across insulating body 60 which is fabricated at the factory under controlled conditions, thereby eliminating voids which might give rise to corona and assuring reliability. The mating frustoconical surfaces of compartment 54 and portion 66 of resilient insulating body 60 and the compression fit between these surfaces effectively increases the breakdown strength between the "hot" and grounded members. The corona extinction voltage of elbow connector 40 is well above the nominal voltage of the power system primary.

Figure 2:
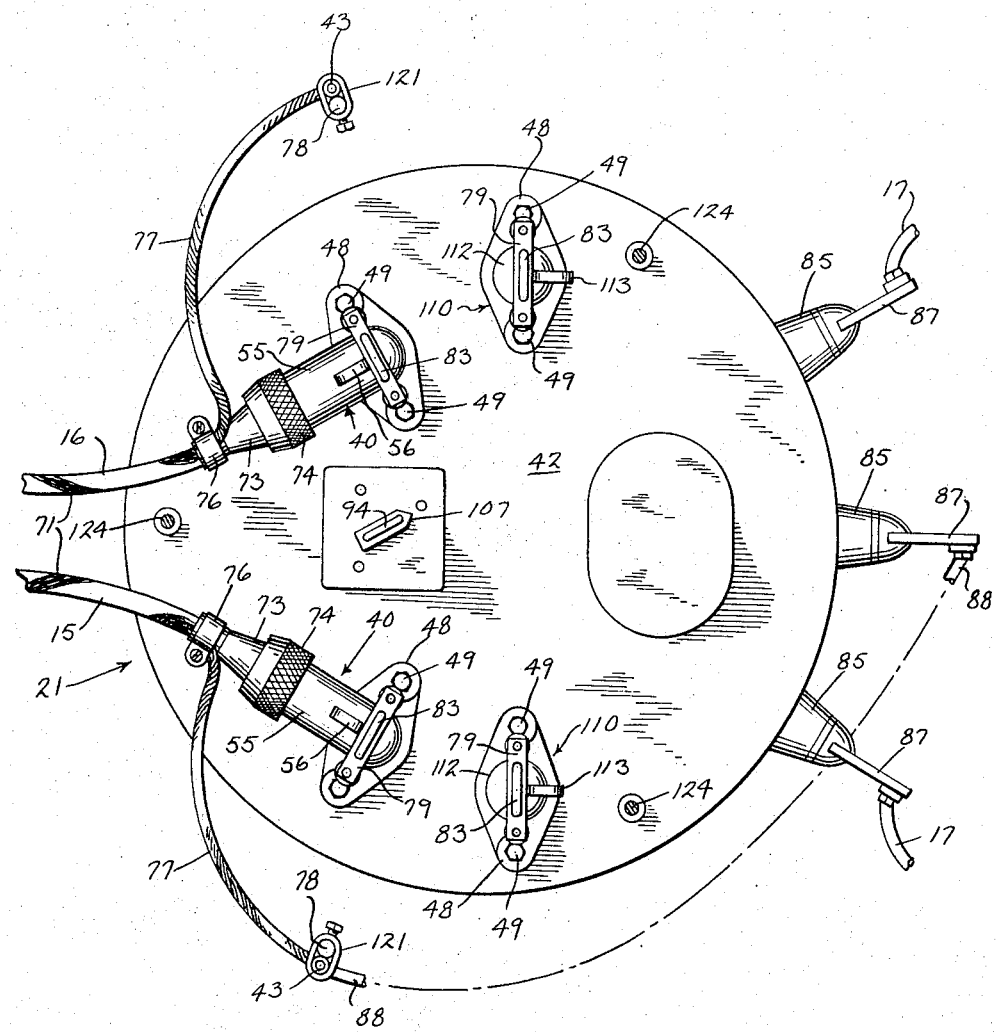
FIG. 2 is a view taken on line 2—2 of FIG. 1.
Figure 3:
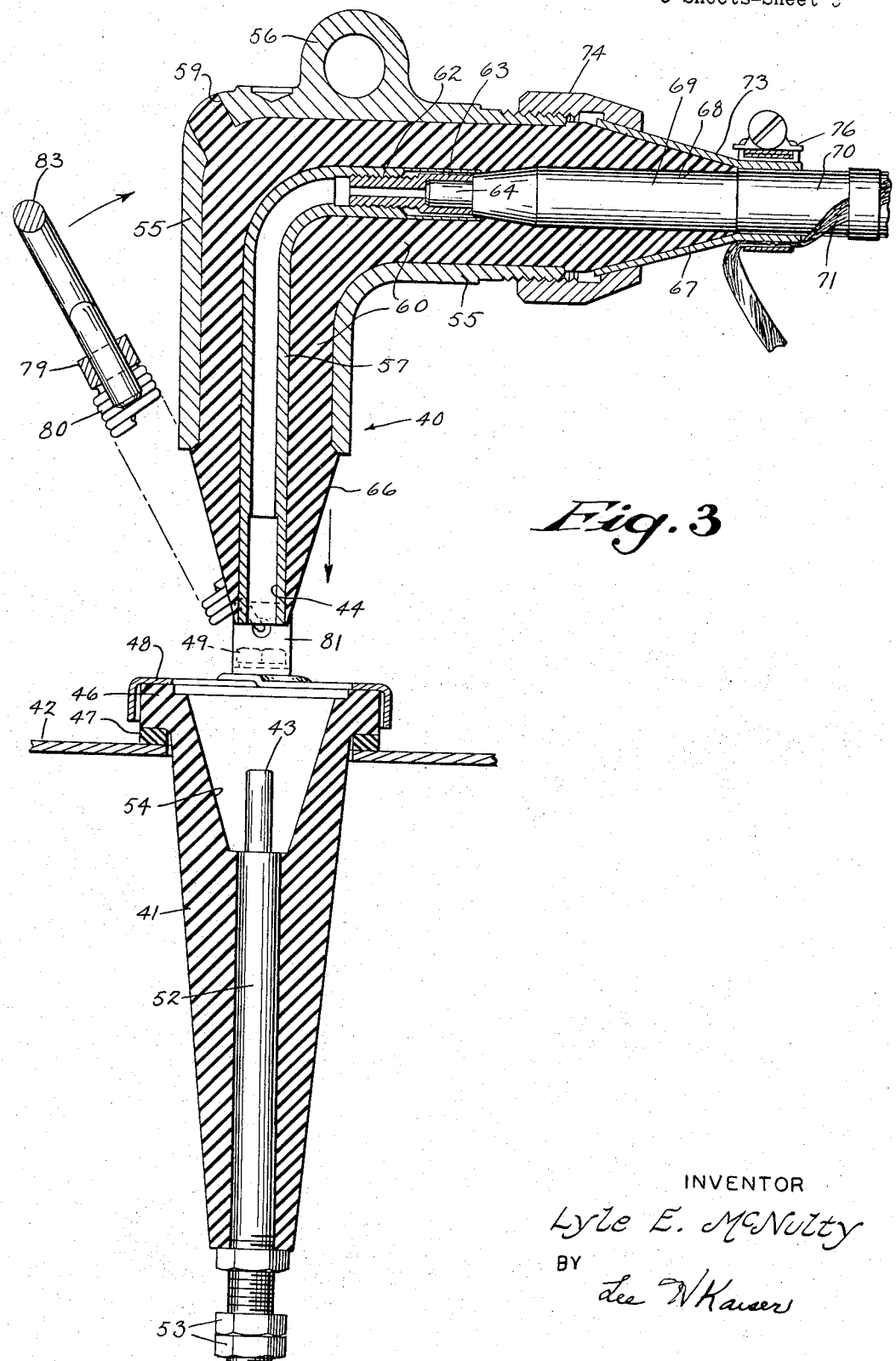
FIG. 3 is a vertical sectional view through one of the separable connectors of the embodiment of FIG. 1.

As shown in the schematic circuit diagram of FIG. 6, the ends of transformer secondary winding 29 within casing 22 are connected to conductor studs on the outer pair of three secondary insulating bushings 85 mounted on the sidewall 86 of transformer casing 22. The conductors of underground secondary cables 17 may have suitable connectors crimped thereon which are secured by bolts to the spade terminals 87 on the outer secondary bushings 85. The spade terminal 87 of the center secondary insulating bushing 85 may be connected by conductor means 88 (see FIG. 2) to a grounding rod 78 driven into the earth, and a grounding lug 89 on transformer casing 22 may also be connected by conductor means (not shown) to a grounding rod 78.

The ends of conductor studs 52 of primary insulating bushings 41 disposed within casing 22 are connected to spaced apart stationary contacts 90 and 91 (see FIG. 6) of a load-break sectionalizing switch 92 positioned within casing 22 under the oil 25 and mounted on casing cover 42. Switch 92 is disclosed and claimed in the copending application Ser. No. 482,730 of Walter Kowalski filed August 26, 1965, now Patent No. 3,316,367, and have the same assignee as the subject invention, to which reference is made for details of construction. Sectionalizing switch 92 may be operated by a hotstick engaged within an eye 94 on an operating shaft 95 extending through casing cover 42 and operatively connected through torsion spring means 96 (shown schematically in FIG. 2) to a driven shaft 98 carrying an L-shaped movable metallic contact 99 adapted to engage stationary contacts 90 and 91. An upper L-shaped arm 101 affixed to the driving shaft 95 and a lower L-shaped arm 102 affixed to the driven shaft 98 are adapted to engage radially extending ends on the torsion spring means 96, and the driven shaft 98 is held until the operating shaft 95 rotates through a predetermined angle and actuates cam means (not shown) to release the driven shaft 98 and permit it to snap the movable contact 99 to a succeeding switch position. A depending circular flange on movable contact 99 is electrically connected through an annular current interchange spring 115 to a metallic cup-shaped member 104 having a stationary terminal portion 105 electrically connected to one end of the transformer primary winding 28. The other end of primary winding 28 may be connected to the grounded metallic casing 22. Movable contact 99 is adapted in one position of sectionalizing switch 92 to simultaneously engage both stationary contacts 90 and 91 and thus connect both incoming and outgoing primary cables 15 and 16 of the modified loop system to the transformer primary winding 28, this position being shown for the three transformers A, C, and D illustrated in FIG. 6. Movable contact 99 is adapted in a second position to engage only stationary contact 91 and thus connect outgoing primary cable 16 to primary winding 28 and to disconnect the incoming cable 15, this position being shown for transformer C in FIG. 6, and permitting feed from Source #2 only. In a third switch position, movable contact 99 is adapted to engaged only stationary contact 90 and thus connect incoming primary cable 15 to primary winding 28 and to disconnect the outgoing primary cable 16, thus permitting feed from Source #1 only. In a fourth switch position movable contact 99 is disengaged from both stationary contacts 90 and 91, whereby primary winding 28 is disconnected from both primary cables 15 and 16, thereby permitting personnel to safely repair and maintain the transformer. An arrow indicator 107 on operating shaft 95 provides position indication of switch position. Switch 92 has a continuous current rating of 300 amperes, a basic impulse level of 95 kilovolts, and an interrupting rating of 12,000 amperes RMS asymmetric.

It will be appreciated that submersion of switch 92 within oil 25 in transformer casing 22 greatly reduces the space required within vault 10 in comparison to an installation having sectionalizing switches within the vault separate from the transformer.

A pair of test caps 110 provided on casing cover 22 permit a lineman to test whether the transformer is energized and also facilitate tapping a radial feed on an existing distribution system. Each test cap 110 mates with an insulating bushing 41 having a terminal stud 43, a bayonet identical to that for each separable connector 40, and the conductor studs 52 for the test caps 110 are connected internally of casing 22 by conductor means 111 (see FIG. 6) to the conductor studs 52 for the insulating bushings of the elbow connectors 40. Each test cap 110 includes an inverted cup-shaped outer member 112 of suitable conductive material such as aluminum secured to casing cover 42 by a bridging bar 79 and hold-down tension springs 80 in a manner identical to that in which separable connectors 40 are secured. Outer member 112 has an eye portion 113 engageable by a hotstick and surrounds an inner member 114 of conductive material such as copper in spaced relation to the inner surface of outer member 112. Inner member 114 may be held within outer member 112 by a cup-shaped insulating body 116 of the same high dielectric strength and high surface resistivity silicone rubber material of which insulating body 60 of the connector 40 is comprised and preferably is also poured at the factory. Inner member 114 terminates in a female connector member, or receptacle 44 identical to that of connector 40 and adapted to mate with the bayonet 43 of any of the four insulating bushings 41 on casing cover 42. Test caps 110 and elbow connectors 40 are thus interchangeable. A sleeve of insulating material 118 surrounds metallic outer body 112 adjacent the open end thereof.

Hold-down springs 80 and bridging bar 79 normally electrically connect outer member 112 to casing 22 and maintain it at ground potential. Removal of bridging bar 79 and hold-down springs 80 by means of a hotstick disconnects outer member 112 from ground and creates a capacitor in which outer member 112 is one electrode with insulating body 116 the capacitor dielectric and the electrically energized inner body 114 the other electrode. The tip of a hotstick bridged between outer member 112 and grounded casing cover 42 will draw a "fuzzing" arc which is visible and audible on a 7200 or 7620 volt transformer. The capacitor coupling is kept low for safety with the result that on 2400 volt transformers the visible and audible response is more difficult to detect, especially in bright sunlight or if the surrounding noise level is high. A glow lamp held by a hotstick in engagement with outer member 112 gives a brilliant response at voltages as low as 2400 volts to indicate to the lineman that the transformer is energized.

If it is desired to tap another feed an existing underground system, a test cap 110 can be removed and an elbow connector 40, which has been assembled with a third underground primary cable 120 (shown schematically in FIG. 6) extending into vault 10, can be mated with the insulating bushing 41 from which the test cap 110 was removed to permit energizing another transformer shown at E in FIG. 6 over primary cable 120. Thus by simply removing one or both test caps 110, one or two radials are immediately available at every transformer location of the underground power distribution system.

A pair of elongated grounding rods 78 preferably of copper driven into the earth within vault 10 are close to the edge of casing cover 42 and disposed adjacent the elbow connectors 40. The grounding rods 78 have terminal studs 43 at their upper end similar to the terminal studs 43 for the four insulating bushings 41. Terminal studs 43 may be connected to grounding rods 78 by suitable clamps and may have tubular portions adjacent their lower end in which the pigtail 77 of strands 71 from the primary cables 15 and 16 may be secured by suitable means such as crimping, or the pigtails 77 may be secured by suitable clamps (not shown) to grounding rods 78. When the elbow connectors 40 are removed by means of a hotstick from the insulating bushings 41, they may be moved laterally and mated with the terminal studs 43 at the top of grounding rods 78, thereby providing a visible open in the primary cables 15 and 16 and solidly grounding the cables when operating procedure requires it.

An anti-tamper plate 123 is mounted on support rods 124 secured to casing cover 42. Anti-tamper plate 123 is disposed above the test caps 110, connectors 40, and switch operating eye 94 and serves to: (1) block vision and thus discourage the curiosity of children, (2) prevent children from tampering with the high voltage components by inserting sticks through grate 31, and (3) to reduce the probability of objects falling on transformer cover 42.

While only a single embodiment of the invention has been illustrated and described, many modifications and variations thereof will be readily apparent to those skilled in the art, and consequently it is intended in the appended claims to cover all such modifications and variations which fall within the true spirit and scope of the invention.

I claim:
1. An underground residential electrical power distribution construction comprising, in combination, a tubular open-ended vault disposed vertically below grade and having a conductor passage means extending therethrough and a removable cover closing its upper end, a distribution transformer disposed within said vault and having a sealed casing and primary and secondary windings, first and second primary insulating bushings on said casing having conductor means extending therethrough and said conductor means being electrically connected together within said casing and to said primary winding, said conductor means of said first and second bushings having similar first connector members thereon exterior of said casing, secondary bushing means on said casing having conductor means extending therethrough connected to said secondary winding, a secondary underground cable extending through said conductor passage means into said vault and being connected to said conductor means of said secondary bushing means, a pair of second connector members complementary to and releasable from and normally mated from said first connector members, an insulating cap covering the one second connector member which is mated with the first connector member on said first primary bushing, and a primary underground cable extending through said conductor passage means into said vault and being connected to the other second connector member, and means for grounding said metallic casing.

2. An underground distribution construction in accordance with claim 1 and including an outer conductive element on said insulating cap spaced from said one second connector member, releasable metallic means for securing said outer conductive element to said casing, a hollow metallic elbow member surrounding said other second connector member, an insulating member within said elbow member disposed between it and said other second connector member, and releasable metallic means for securing said elbow member to said casing and wherein said primary cable has an outer conductive wrapping end including means for connecting said elbow member to said outer conductive wrapping and to ground.

3. An underground distribution construction in accordance with claim 1 wherein said primary cable has a central conductor surrounded by insulation and an outer conductive wrapping and including conductive means surrounding said mated first and second connector members connected to said conductor means of said second primary bushing and being connected to said wrapping for providing a continuous ground shield between said cable and said casing and being adapted to be opened.

4. An underground distribution construction in accordance with claim 3 wherein said means for providing a continuous ground shield includes a hollow metallic elbow member surrounding said other second connector member and having an eye portion adapted to be engaged by a Hotstick and also includes an insulating element disposed between these members, releasable metallic means for securing said elbow member to said casing, and means including a frustoconical metallic member engaging said conductive wrapping at its smaller diameter end and said elbow member at its larger diameter end for preventing concentration of lines of electrical force at the end of said conductive wrapping.

5. An underground construction in accordance with claim 1 wherein said vault is of bituminized fiber and including another first connector member similar to said first connector members on said first and second primary insulating bushings and being disposed adjacent said casing and adjacent said second primary bushing and also including grounding rod means driven into the earth for connecting said another first connector member to ground, whereby said other second connector member may be temporarily supported on said another first connector member and ground when it is disengaged from said first connector member on said second primary bushing.

6. An underground construction in accordance with claim 1 including a third primary insulating bushing on said casing having conductor means extending therethrough and said conductor means having a first connector member thereon exterior of the casing similar to said first connector members on said first and second primary bushings, a sectionalizing switch within said casing having a pair of stationary contacts connected to said conductor means on said first and third primary bushings and a movable contact electrically connected to said primary winding and being adapted to selectively engage and stationary contacts individually and also collectively and to be isolated from said stationary contacts, means extending through a wall of said casing and being accessible from the exterior of said casing for operating said sectionalizing switch, a second underground primary cable extending through said conductor passage means into said vault, and another second connector member complementary to and releasable from and normally mated with said first connector member on said third insulating bushing and being connected to said second primary cable.

7. An underground construction in accordance with claim 6 and including an outer conductive element on said insulating cap and releasable metallic means for securing said outer conductive element to said casing and for grounding it and wherein each connector associated with said second and third primary insulating bushings comprises a separable connector including an outer metallic hollow elbow body surrounding second said connector portion and having an eye adapted to be engaged by a Hotstick, an insulating member within said elbow body disposed between said elbow body and said second connector portion, and releasable metallic means for securing said elbow body to said casing.

8. For use in an underground residential electrical power distribution system, in combination, a metallic transformer casing, a dielectric insulating fluid in said casing, a transformer core and coil assembly having inductively related primary and secondary windings within said casing, first and second primary insulating bushings on said casing having conductor means extending therethrough and said conductor means being electrically commoned within said casing and connected to said primary winding, first and second connectors having separable complementary portions and similar portions of said first and second connectors engaging said conductor means of said first and second primary bushings, and an insulating cap covering the other portion of said first connector, the other portion of said second connector having means for engaging the conductor of an underground primary cable.

9. The combination set forth in claim 8 wherein an outer conductive element is disposed on said insulating cap and releasable metallic means secures said conductive element to said casing, and wherein a cable terminating assembly surrounds the other portion of said second connector means and includes an outer hollow metallic elbow member surrounding the other portion of said second connector, and insulating material disposed within said elbow member and surrounding the other portion of said second connector, and releasable metallic means for securing said elbow member to said casing.

10. The combination set forth in claim 8 wherein the other portion of said second connector is surrounded by a tubular insulating member which is adapted to abut said second primary bushing for providing a moistureproof enclosure when the portions of said second connector are mated, and wherein said insulating cap includes a cup-shaped insulating member surrounding the other portion of said first connector and adapted to abut against the first primary bushing for providing a moistureproof enclosure for said first connector when the portions thereof are mated.

11. The combination set forth in claim 8 and including a third primary insulating bushing on said casing and having conductor means extending therethrough and a third connector having separable complementary portions, a first portion of said third connector member engaging said conductor means, a sectionalizing switch within said casing and having first and second stationary contacts connected to said conductor means of said second and third bushings, respectively, and a movable contact electrically connected to said primary winding and adapted to selectively engage said first and second stationary contacts individually and both of said stationary contacts simultaneously and to be isolated from both of said stationary contacts, a second connector member complementary to and normally mated with the first connector member of said third connector, the other portion of said third connector having means for engaging the conductor of an underground primary cable.

12. The combination set forth in claim 11 and including an outer conductive element on said insulating cap and releasable metallic means for securing said outer conductive element to said casing, and metallic elbow members surrounding the second connector members normally mated with the first connector members of said second and third bushings, insulating material within said elbow members disposed between said elbow members and said other connector portions, and releasable metallic means for individually securing said elbow members to said casing.

13. The combination set forth in claim 9 wherein said first and second bushings have substantially identical surfaces and wherein said insulating cap and the insulation of said elbow connector have substantially identical surfaces for mating with the surfaces on said bushings, whereby said test cap and elbow connector are interchangeable so that a radial feed including a primary cable terminating in a similar elbow connector may be energized from said transformer by removing said insulating cap and engaging the second connector portion of said similar elbow connector with said first connector portion of said first primary bushing.

References Cited

UNITED STATES PATENTS

| | | |
|---|---|---|
| 1,873,977 | 9/1932 | Naef. |
| 2,228,237 | 1/1941 | Sofield et al. |
| 3,239,599 | 3/1966 | Linderholm _____ 174—18 X |
| 3,287,566 | 11/1966 | Lang et al. _____ 174—37 X |
| 3,307,137 | 2/1967 | Tordoff et al. _____ 174—18 X |

ORIS L. RADER, *Primary Examiner.*

T. B. JOIKE, *Assistant Examiner.*

UNITED STATES PATENT OFFICE

CERTIFICATE OF CORRECTION

Patent No. 3,377,487                        April 9, 1968

Lyle E. McNulty

It is certified that error appears in the above identified patent and that said Letters Patent are hereby corrected as shown below:

Column 9, line 54, "ground" should read -- grounded --; line 66, "and", second occurrence, should read -- said --.

Signed and sealed this 29th day of July 1969.

(SEAL)
Attest:

Edward M. Fletcher, Jr.                  WILLIAM E. SCHUYLER, JR.
Attesting Officer                            Commissioner of Patents